W. A. BARKER.
FRICTION BRAKE MECHANISM.
APPLICATION FILED JAN. 14, 1908.
983,668.
Patented Feb. 7, 1911.
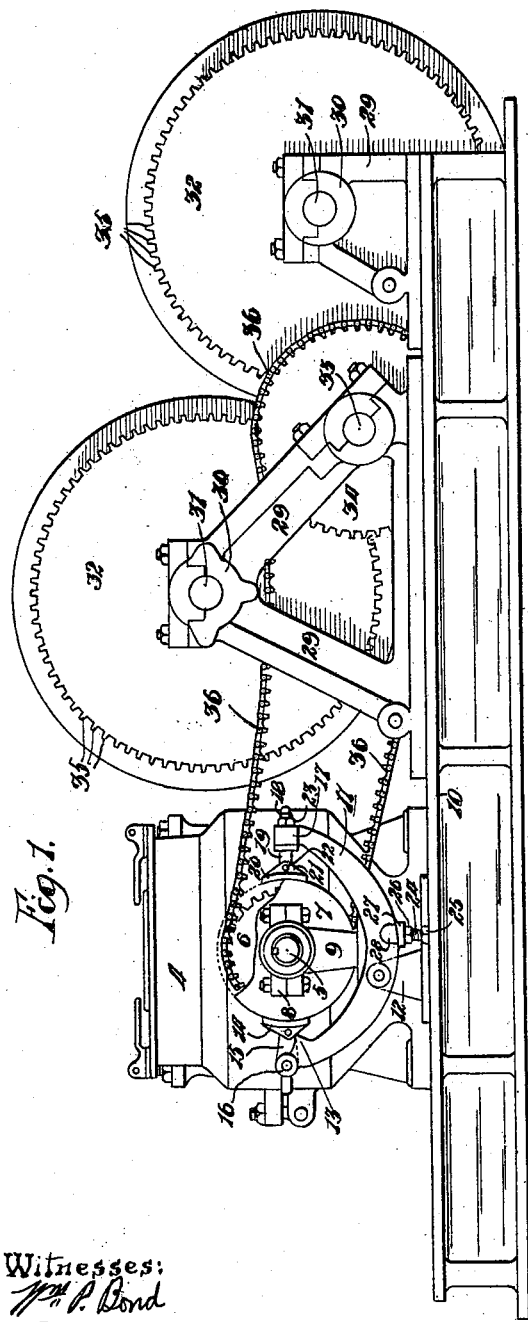

UNITED STATES PATENT OFFICE.

WENDELL A. BARKER, OF CHICAGO, ILLINOIS.

FRICTION-BRAKE MECHANISM.

983,668.	Specification of Letters Patent.	Patented Feb. 7, 1911.

Application filed January 14, 1908. Serial No. 410,771.

*To all whom it may concern:*

Be it known that I, WENDELL A. BARKER, a citizen of the United States, residing at Chicago, in the county of Cook and State of Illinois, have invented certain new and useful Improvements in Friction - Brake Mechanism, of which the following is a specification.

The appliance of the present invention is primarily adapted to be used in connection with the actuating mechanism of elevator apparatus, although, if desired, it can be used in connection with other machinery.

It is the essential object of my present invention to construct friction brake mechanism for quickly and positively regulating the movement and action of the winding drums of the elevator apparatus preventing retrograde movement of the motor shaft so that it will be absolutely certain and reliable in operation, thus efficiently adapting itself for all intended purposes.

In the drawings illustrating the invention Figure 1 is a side elevation, partly in section, of my improved friction brake mechanism as used in connection with elevator apparatus; Fig. 2 a side elevation of the friction brake mechanism; and Fig. 3 a top or plan view of the friction brake.

My improved friction brake is more especially intended to be used in connection with, and as shown, is mounted alongside of an electric motor 4 having keyed upon its revoluble shaft 5 a gear wheel 6, and a friction wheel 7 respectively, said friction wheel 7 being positioned near the farther end of the shaft 5 which is mounted in a journal box 8 carried upon a post 9 as illustrated in Figs. 1 and 2.

The motor 4 is secured, as indicated, upon a bed plate 10, in any approved manner. A yoke member 11 is mounted eccentrically with respect to the revoluble shaft 5 upon an upright or standard 12 secured at its lower end to the aforesaid bed plate. At one end of the yoke member 11 is formed a projecting shoulder 13, as shown, which engages and limits the downward thrust of the brake shoe 14, which in turn is secured to a link member 15 pivotally mounted at its rear end 16. When the brake shoe 14 engages the shoulder 13 it comes into frictional contact with the periphery of the friction wheel 7, thus preventing retrograde movement. Upon the other end of the yoke member is a collar 17 preferably formed integral with said yoke, which, as illustrated, retains the threaded shank or stem 18 having at its inner end a tongue 19. In the construction shown the brake shoe 20 has a pair of companion ears 21 extending therefrom affording suitable means for connecting the shaft and shoe when a bolt 22 is secured therein. A nut 23 upon the outer end of the threaded stem 18 securely positions the shoe 20.

As before stated, the yoke 11 is eccentrically mounted upon the standard 12, and adjacent thereto is a threaded stem 24 having a lock nut 25 near its lower end, and an adjusting nut 26 adapted to contact a lug 27 formed on the body of the yoke 11. Immediately above said lug 27 is formed a boss 28 which receives the upper end of the threaded stem 24. It will be noted that the yoke member 11 is constructed with especial regard to adapting itself to constant use, since the adjusting nut 26 may be readily manipulated for properly positioning the brake shoe 20.

The aforesaid friction brake is adapted to be used chiefly in connection with elevator apparatus; and as shown, the sections of the supporting frame 29 are secured together in such manner as to provide journal bearings 30 within which the axles 31 of the respective winding drums 32, as well as the axle 33 of the sprocket wheel shaft may revolve. Upon the aforesaid shaft 33 is keyed the sprocket wheel 34 as well as a pinion, not shown, which pinion is in engagement with the spur gear teeth 35 of the winding drums. A sprocket chain 36 of any approved type engages the teeth of the sprocket wheels 6 and 34 respectively, thus enabling power to be transmitted from the motor 4 to the winding drums 32.

From the foregoing it will be apparent that as the friction wheel 7 is driven in the direction of the arrow, it will cause the brake shoe 14 to slightly rise, as in Fig. 2; and when the same is stopped, that said shoe resumes its normal position wherein it lies in frictional contact with the periphery of the friction wheel 7 as in Fig. 1. When, through continuous use, the eccentrically mounted yoke 11 needs readjustment, the same is accomplished by manipulating the threaded stem 24. When the brake shoe 14 is brought into the position shown in Fig.

1, in which it is in peripheral contact with the wheel 7, the shoulder 13 engaging the brake shoe, retrograde movement of the motor shaft is prevented. The threaded stem 24, having the locking nut and adjusting nut, is serviceable in readjusting the yoke in its proper position after continuous use some of the parts having become worn. The yoke member being eccentrically mounted causes pressure to bear upon the other brake shoe 20 which locks itself upon the periphery of the friction wheel.

The device is of such a character as to be very efficient and reliable in operation and at the same time is comparatively simple in construction.

What I claim as new and desire to secure by Letters Patent is:

1. In a brake mechanism, a frame work, a yoke and a friction wheel, the yoke being mounted on the framework eccentrically with respect to the wheel, a brake shoe rigidly attached to the yoke and a brake shoe flexibly attached to the yoke, there being a projecting shoulder on the yoke in position to engage the flexibly supported brake shoe, substantially as described.

2. In a brake mechanism, a yoke provided with a stop shoulder and a friction wheel and means for supporting the yoke eccentrically with respect to the friction wheel, a brake shoe rigidly attached to one arm of the yoke and a brake shoe flexibly attached to the other arm thereof and in position to engage the shoulder of the yoke in a manner to prevent retrograde movement of the friction wheel, substantially as described.

3. In a brake mechanism, a friction wheel and a yoke pivotally supported eccentrically with respect to the friction wheel, a brake shoe rigidly attached to one arm of the yoke and a brake shoe flexibly attached to the other arm of the yoke, and means for rotatably adjusting the yoke with respect to the friction wheel, substantially as described.

WENDELL A. BARKER.

Witnesses:
  WALKER BANNING,
  PIERSON W. BANNING.